United States Patent Office 3,843,554
Patented Oct. 22, 1974

3,843,554
CATALYST COMPOSITIONS OF SCHEELITE CRYSTAL STRUCTURE CONTAINING VANADIUM, BISMUTH AND CATION VACANCIES
Kamran Aykan, Woodbury, N.J., and Donald B. Rogers and Arthur W. Sleight, Wilmington, Del., assignors to E. I. du Pont de Nemours and Company, Wilmington, Del.
No Drawing. Continuation-in-part of abandoned application Ser. No. 75,237, Sept. 24, 1970. This application Oct. 4, 1971, Ser. No. 186,407
Int. Cl. B01j 11/06
U.S. Cl. 252—468         4 Claims

ABSTRACT OF THE DISCLOSURE

Catalysts for the oxidation, ammoxidation and oxidative dehydrogention of olefins have a scheelite crystal structure, vanadium, bismuth and cation vacancies. Illustrative is $Pb_{.79}Bi_{.173}\square_{.037}Mo_{.90}V_{.10}O_4$.

RELATED APPLICATION

This application is a continuation-in-part of our application Ser. No. 75,237 filed Sept. 24, 1970 now abandoned.

BACKGROUND OF THE INVENTION

Field of the Invention

The invention relates to catalytic oxidation and ammoxidation of olefins, as for example, the conversion of propylene to acrolein or to acrylonitrile. The catalysts have a scheelite-type crystal structure and contain vanadium, bismuth ions and cation vacancies.

Prior Art

Catalysts for the oxidation and ammoxidation of olefins are known in the art and include materials based on bismuth molybdate where the bismuth is present above a definite minimum ratio with respect to the molybdenum. The art generally teaches the amount of bismuth should not be less than ⅓ the amount of molybdenum and preferably the ratio should be 3:4, or more, in order to avoid sublimation of the molybdenum and consequent decomposition of the catalyst. Such catalysts have disadvantages in being relatively brittle and thermally unstable. Austrian Pats. 247,304 and 248,410 seek to overcome these disadvantages by combining bismuth and molybdenum oxides with divalent metals such as calcium and lead. Koch patent U.S. 3,387,038 teaches that molybdenum oxide is effective as a catalyst when combined solely with alkaline earth oxides although the catalytic effect is further promoted by minor amounts of many elements including bismuth. Even the preferred embodiments of Koch's catalysts, however, give relatively low conversions of propylene to acrolein and require the periodic addition of molybdic acid in order to prevent the loss of that activity. U.S. Pat. 3,492,248 to Notari et al. discloses that bismuth vanadate modified by the presence of molybdenum atoms forms an effective catalyst combination over most of the $Bi_2O_3$-$V_2O_5$-$MoO_3$ ternary system.

Silicon and phosphorus are widely recognized as useful promoters for bismuth-molybdenum oxide compositions used as catalysts. This is believed to be related to the well known tendency of these two elements to combine in mixed oxides (heteropoly acids) with molybdenum and tungsten. Silica can be intimately incorporated by combining the catalyst precursors in the presence of a colloidal silicic acid. Even though such silica may be termed a "support," its special interaction is recognized by Callahan et al., U.S. 3,362,998 and McClellan, U.S. 3,415,886, and auxiliary supports are generally used to support these silica-bearing catalysts during reaction.

DESCRIPTION OF THE INVENTION

It has now been found that compositions having a phase, generally indicated by the formula $ABO_4$, of scheelite-type crystal structure containing vanadium in which some of the A cation sites are vacant, that is, not occupied by any ions, and some of which are occupied by bismuth ions, are effective catalyst for the ammoxidation of olefins to unsaturated nitriles, the oxidation of olefins to unsaturated aldehydes, and the oxidative dehydrogenation of olefins to diolefins. The number of the A sites that are either cation vacancies (represented hereinafter by the symbol $\square$) or occupied by bismuth ions may be very small but these two types of site occupation must coexist for the composition to have high catalytic activity.

It has been further found that the remaining A cation sites, and the B cation sites not occupied by vanadium, may be occupied by a variety of positive ions of appropriate size, that is, having ionic radii which will not substantially change the scheelite crystal structure. A large number of ions may be selected provided the electrical charge of the composition is zero.

The ions occupying the type A sites of the scheelite-type crystal structure generally are coordinated by eight surrounding oxygen atoms and have ionic radii appropriate to this coordination in the range of about 0.9 to about 1.6 A. Such ions include bismuth. lead, cadmium, calcium, silver, sodium, lithium, strontium, potassium, barium, zirconium, hafnium, yttrium, lanthanides (elements having an atomic number of 57–71), uranium, thallium, mercury and thorium.

The ions occupying the type B sites of the scheelite-type crystal structure are generally tetrahedrally coordinated by oxygen and have ionic radii appropriate to this coordination of about 0.3 to about 0.5 A. and include in addition to vanadium which is always present, ions such as molybdenum, tungsten, iron, germanium, zinc, arsenic, rhenium, gallium, aluminum, niobium and chromium.

It is preferred for maximum effectiveness that the catalytically active component consist essentially of a single phase scheelite.

A further preferred embodiment of the invention, because of their excellent catalytic activities, are the compositions $ABO_4$ in which about 0.1 to about 15% of the A cation sites are unoccupied.

Another preferred embodiment are the scheelite compositions containing lead as A cation.

The invention may thus be described as a catalyst which has scheelite-type crystal structure of the general formula

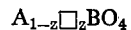

wherein A represents cations having ionic radii in the range of about 0.9 to about 1.6 A., some of which are trivalent bismuth, and at least one other is selected from the group consisting of lead, calcium, strontium, barium, zirconium and hafnium; B represents cations having ionic radii in the range of about 0.3 to about 0.5 A. comprising vanadium or vanadium and molybdenum; and z is a positive number in the range of about 0.001 to about 0.15.

"Scheelite-type crystal structure" means a phase of generic type $ABO_4$ with an atomic arrangement analogous to that found in the mineral scheelite ($CaWO_4$). A discussion of scheelite crystals may be found in R. W. G. Wyckoff "Crystal Structures," Vol. 3, second edition 1965, pp. 19–22, published by Interscience Publishers. Scheelite crystal structures generally have tetragonal symmetry and can be characterized by the two lattice constants $a_0$ and $c_0$ as obtained by x-ray diffraction data. The range of $a_0$ is about 4.8 to 6.0 A. and the ratio of $c_o/a_o$ is about 2. The atomic arrangement in the scheelite structure, also given by Wyckoff, gives rise to a characteristic x-ray diffraction pattern by which materials having scheelite crystal structure can be identified.

It is to be understood that "scheelite-type crystal structure" is intended here and in the claims to also cover variant crystal structures which have minor distortions in angle or edge size from the usual or classical tetragonal symmetry given above. For example, when the distortion resides in a third lattice constant, $b_o$, an orthorhombic distortion results while a distortion in either angle $\beta$ or $\gamma$ results in a monoclinic distortion. Where $b_o$ is within 10% of the value of $a_o$, each being in the range of about 4.8 to 6.0 A., and where the angle $\beta$ or $\gamma$ is within 5° of the normal 90° angle, such crystal structures are contemplated to be within the scope of scheelite crystal structures of this invention. It should also be noted that $a_o$ and $c_o$ or $b_o$ and $c_o$ may be interchanged to conform to certain crystallographic conventions and in the case of monoclinic symmetry the unit cell may be redefined so that $\beta$ or $\gamma$ departs greatly from 90°. In all the variations which may occur, however, the essential atomic arrangement is present which determines and characterizes scheelite crystal structure. That atomic arrangement is identified by the characteristic X-ray diffraction pattern it produces even though some of the diffraction peaks will be split in the case of the variant crystals.

It will also be recognized that where a single type of cation site is occupied by more than one cation, then under some conditions nonrandom site occupation will produce superstructure lines in the characteristic scheelite X-ray pattern. Under such circumstances the exact characterization by unit cell parameters will require multiplication of one or more of the unit cell dimensions by a small whole number in order to characterize the special proportionate distribution of cations.

The charge on the various A and B metal ions can be varied consistent with the requirement that the sum of the positive charges of all A and B metal ions is exactly balanced by the sum of the charges on the negative ions. The generic formula $ABO_4$ for scheelite thus includes ternary oxides ranging from $$A^{+1}B^{+7}O_4 \text{ to } A^{+4}B^{+4}O_4$$

as well as polynary oxides where either A or B both may comprise a mixture of ions of appropriate size whose average charge is covered by the range above.

The presence of bismuth ions on the type A cation sites can be determined by customary analytical procedures for the determination of bismuth since its ions are too large for the type B sites. In eight-fold coordination $Bi^{3+}$ has an ionic radius of 1.11 A. and is well suited for type A sites.

The presence of unoccupied type A cation sites can be determined by a deficiency of type A cations with respect to type B metal ions. Since in the scheelite structure there is one A and one B site per formula $ABO_4$ and since the B cation sites are always fully occupied by the type B atoms, the number of type A cation vacancies, $z$, can be determined by subtracting the number of type A atoms from the number of type B atoms. Thus in the single-phase scheelite composition whose formula has been determined by elemental analysis as $$Zr_{.15}^{+4} Bi_{.80}^{+3} V^{+5}O_4$$

the sum of the type A gram atoms is 0.95. Since there is one B type atom (vanadium) present in the above formula, it follows that the sum of the two type A atoms zirconium and bismuth) plus any type A site vacancies, must equal 1. As noted, however, the type A atoms which are present total only .95 which indicates there are .05 type A sites that are vacant. The formula for the above single phase scheelite composition is therefore more properly written as $$Zr_{.15}Bi_{.80}\square_{.05}VO_4$$

$$Zr_{.15}Bi_{.80}\square_{.05}VO_4$$

This composition is electrically neutral since the 8 negative charges from oxygen are just balanced by 5 positive charges from vanadium, 2.40 ($3\times.80$) from Bi, and .60 from Zr for a total of 8 positive charges.

The $BO_4$ tetrahedra are characteristic of the scheelite structure even though a certain amount of type A cations which link adjacent tetrahedra may be missing from the lattice. Thus, oxides of the scheelite phase will have, within normal analytical accuracy, four oxygen anions per B cation. In preparing scheelite catalysts of the invention the component oxides or their oxide precursors should be chosen so that in their normal oxidation states after calcining, as hereinafter described, four gram atoms of oxygen will be present for each gram atom of B cation. The presence of substantially more or less oxygen relative to the B cation will lead to dilution of the $ABO_4$ catalyst of the invention with another phase. The proper proportions of the various oxides or oxide precursors that should be combined to form a pure scheelite phase of desired vacancy content can be readily determined from the requirements of electroneutrality and site occupation described above. In the simple case where vanadium alone occupies the B sites and the necessary cation vacancies result from simple permutation of the A cation charge, the following generic formula pertains for ternary metal oxides, where $z$ equals the number of vacancies:

$$A_{3z}^{+4}A_{1-4z}^{+3}\square_z V^{+5}O_4$$

The necessary type A cation vacancies can also be provided by permutations of variously charged ions on the type B cation sites as in the composition $$Y_{.93}Bi_{.005}\square_{.065}V_{0.9}Re_{0.1}O_4.$$

It will be understood that further permutation of both type A and type B cations as in the composition:

$$Li_{0.35}Bi_{0.55}\square_{0.10}Re_{0.5}V_{0.5}O_4$$

can be devised to provide a very wide range of new catalytic materials with any desired content of vanadium, bismuth and type A cation vacancies.

It should be kept in mind that when the number of defects or cation vacancies becomes too high, their random occurrence may be replaced by an ordered arrangement with the production of a crystal structure that departs from the limits hereinbefore described for the scheelite structure. It is to be expected that the change from the scheelite structure to other phases with ordered vacancies will depend in a complex way on the temperature and on the particular ions in the lattice. It has been observed that no more than about 15% of the A cation sites are vacant at the highest temperature of equilibration; however, at lower temperatures much fewer vacancies can be tolerated before some other phase is found to be present along with the scheelite phase. The catalytic activity is not destroyed if another phase is present along with the scheelite phase of the invention. However, it is desirable for maximum effectiveness to prepare the catalyst compounds as substantially pure phases. There are characterized by X-ray diffraction powder diagrams which can be indexed in their entirety according to the scheelite structure. Large amounts of excess or unreacted components will act as diluents and can interfere with the intended catalytic function, particularly if they accumulate at the surface.

The vanadium-containing catalysts of the invention may thus be characterized in that:

1. There are four oxygen atoms for each B atom.
2. The type A and type B ions are selected from those cations appropriate to the scheelite structure as indicated herein.

3. They are electrically neutral, the number of positive charges exactly equaling the number of negative charges.
4. Some of the type B sites are always occupied by vanadium.
5. The type A sites, equal in number to the type B sites, include sites which are unoccupied and sites which are occupied by trivalent bismuth.
6. Their X-ray diffraction pattern is characteristic of scheelite crystal structure.

The catalysts of the invention can be prepared by various methods. The usual method is to calcine mixtures of oxides, or any salt which yields the corresponding oxide by thermal decomposition, e.g., carbonates, nitrates oxalates, hydroxides, etc., in the proper ratios for the desired composition. The catalysts can also be prepared by mixing solutions containing proper amounts of the type A and type B metal salts, evaporating, drying, and finally calcining. The starting solutions are usually nitrates in the case of the type A cations, but other soluble salts can be used. The solvent can be water or an organic liquid depending on the solubility of the salt. The amount of solvent is not critical and it is preferred to use only that amount needed to effect complete solution of the salt.

Calcining temperatures vary from about 400 to about 1100° C. The optimum temperature depends upon the particular composition being prepared. Higher temperatures are preferred in order to facilitate reaction and to assure a homogeneous product. A critical upper limit for calcining temperatures is imposed by the formation of a liquid phase. The products of the invention have incongruent melting points, i.e., the liquid and solid in equilibrium in the melting range have quite different compositions. A liquid phase formed during calcining tends to produce both compositional and physical segregation which are difficult to homogenize at lower temperature. Higher temperatures are favored in general for catalysts containing tungsten while lower temperatures are used for catalysts rich in bismuth and molybdenum.

The time of calcination is not critical; times of 1 to 100 hours may be used, but 16–48 hours is preferred. Longer times are required at lower temperatures. Calcining times may be shortened and homogeneity of the products improved by regrinding between periods of heating. A generally advantageous procedure is to grind the dry components intimately, calcine for 2–16 hours at 600–800° C., then regrind and calcine again for 16–32 hours at 600–800° C.

The container used for calcining may be made of various inert materials such as gold or other precious metals, alumina or other ceramics. The calcination is usually carried out in a muffle furnace in which the sample is exposed to an atmosphere of air. Reducing atmospheres should be avoided to prevent the reduction of oxides of easily reduced metals such as silver, lead, and bismuth.

The completeness of the reaction may be followed by X-ray diffraction of the products at any stage. When formation of a cation-deficient scheelite phase is complete, all lines of the X-ray powder pattern can be indexed on the basis of a scheelite-type unit cell with line intensities in qualitative agreement with those expected for the scheelite structure. The dimensions of the unit cells of these scheelite phases vary significantly with changes in either type or number of cations in the A sites, and can be used to characterize the composition of the phase obtained.

The products of the invention are excellent heterogeneous catalysts for organic oxidation reactions. They are particularly useful for the oxidation of propylene to acrolein, the production of acrylonitrile from propylene, $NH_3$, and $O_2$, and the conversion of butene to butadiene. The catalysts show excellent conversions of propylene, good selectivity, and retain their high initial activity without need for frequent and costly regeneration steps. The presence of water in the feed gas is not necessary as it is with many prior art catalysts, but it may be used if desired. Air or oxygen may be used, or the feed gas may be further diluted with nitrogen, for example. The catalysts may be used in fixed-bed or fluidized-bed reactors; they may be used with most of the usual catalyst support materials or they may be used without support, and any type of reactor suitable for vapor phase reactions may be employed.

The temperature of the reaction zone may vary from 350° C. to 550° C., although it is preferred to operate within the temperature range of 400° C. to 500° C. The actual surface temperature of the catalyst particles may be considerably higher because of the exothermic nature of the reaction. Pressure is not a critical factor in the practice of this invention. The process may be conveniently operated at atmospheric pressure. In most instances, the reaction is conducted at pressures ranging from 0.5 to 10 atmospheres, but higher or lower pressures may be used if desired.

The oxygen used in this process may be obtained from any source, although it is generally most economical and convenient to use air. Alternately, pure oxygen or mixtures of oxygen and air may be employed in the oxidation process, including the oxidative dehydrogenation process, and a mixture of air and ammonia for the ammoxidation process.

The use of very high surface area or reactive materials as catalyst supports is to be avoided. In particular, intimate mixtures of the cation-deficient scheelite compositions of the invention with reactive materials such as silica should not be excessively heated.

It will be obvious to one skilled in the use of catalysts for carrying out oxidation reactions that the composition of the catalytic sites on the catalyst surface during the course of the reaction may depart somewhat from initial stoichiometry. Particularly in oxidation reactions elements of variable valency may coexist in more than one oxidation state as an essential feature of the catalytic mechanism. Thus in the present invention it is contemplated for example that vanadium may be present to a small extent as other than a pentavalent species. Similarly, bismuth could exist to some small extent in an oxidation state greater than in the normal trivalent cation. Such variations can be equivalently represented as slight departures from the oxygen stoichiometry hereinbefore described. Thus in the idealizer $ABO_4$ formula there might be slightly more or less than 4.00 g. atoms of oxygen, or a small fraction of the $O^{-2}$ ions might be replaced by $OH^-$ ions without departing from the spirit of the invention.

By the term "olefin" as used herein is meant the open-chain as well as cyclic olefins. Among the many olefinic compounds which may be utilized in accordance with the process of the invention, the following compounds are illustrative: propylene, butene-1, butene-2, isobutylene, pentene-1, pentene-2, 3-methylbutene-1, 2-methyl-butene-2, hexene-1, hexene-2, 4-methyl pentene-1, 3,3-dimethyl-butene-1, 4-methyl-pentene - 2, octene-1, cyclopentene, cyclohexene, 3-methyl-cyclohexene, etc. This invention is directed particularly to the oxidation of the lower alkenes (3 to 8 carbon atoms) but higher alkenes may also be utilized with efficacy. These compounds and their various homologs and analogs may be substituted in the nucleus and/or in the substituents in various degrees by straight-chain alicyclic or hetero-cyclic radicals. The process of the invention is applicable to individual olefins as well as to mixtures of olefins.

The process of this invention is particularly adapted to the conversion of propylene to acrolein, isobutylene to methacrolein, butene-1 or butene-2 to methyl vinyl ketone, pentene-1 or pentene-2 to ethyl vinyl ketone and/or pentene-3-one-2, 2-methyl-butene-2 to methyl isopropenyl ketone, cyclopentene to cyclopentenone-2, and the like.

SPECIFIC EMBODIMENTS OF THE INVENTION

The following are illustrative examples in which all parts or percentages are by weight unless otherwise stated.

EXAMPLE 1

PbO (40.07 g.), $Bi_2O_3$ (9.160 g.), $V_2O_5$ (2.0668 g.), and $MoO_3$ (29.44 g.) were ground together and heated for about 10 hours at 800° C. The resulting scheelite phase has the composition $Pb_{.79}Bi_{.173}\square_{.037}Mo_{.9}V_{.1}O_4$ and is an active catalyst, (49% conversion of the initial propylene to acrylonitrile).

When, however, the composition is adjusted to produce a scheelite phase free from the cation vacancies of this invention, catalytic activity decreases greatly. Thus, 26.783 g. of PbO, 27.958 g. of $Bi_2O_3$, 10.913 g. of $V_2O_5$ and 17.273 g. of $MoO_3$ combined under the same conditions as above (10 hours at 800° C.) to form a defect-free scheelite of composition $Pb_{.5}Bi_{.5}V_{.5}Mo_{.5}O_4$, shows almost no catalytic activity (1.6% conversion) in the synthesis of acrylonitrile from propylene.

Using the procedures given in this specification the following products of the invention are obtained.

TABLE I $Zr_{.55}Bi_{.40}\square_{.05}Fe_{.20}V_{.80}O_4$
$Zr_{.03}Bi_{.96}\square_{.01}VO_4$
$Th_{.45}Bi_{.40}\square_{.15}As_{.50}V_{.50}O_4$
$Ag_{.10}Bi_{..80}\square_{.10}W_{.5}V_{.5}O_4$
$Sr_{.79}Bi_{.17}\square_{.04}Mo_{.90}V_{.10}O_4$
$Ca_{.15}Bi_{.80}\square_{.05}Mo_{.20}V_{.70}O_4$

What is claimed is:

1. A catalyst which has scheelite-type crystal structure of the formula $A_{1-z}\square_z BO_4$ wherein A represents cations having ionic radii in the range of about 0.9 to about 1.6 °A, some of which are trivalent bismuth, and at least one other is selected from the group consisting of lead, calcium, strontium, barium, zirconium and hafnium;

B represents cations having ionic radii in the range of about 0.3 to about 0.5 °A comprising vanadium or vanadium and molybdenum;

$\square$ represents a cation vacancy in the crystal structure; and z is a positive number in the range of about 0.001 to about 0.15.

2. A catalyst according to Claim 1 on a support.

3. A catalyst according to Claim 1, in which lead is present as an A cation.

4. The catalyst according to Claim 1 which is $Pb_{.79}Bi_{.173}\square_{.037}Mo_{.90}V_{.10}O_4$.

References Cited

UNITED STATES PATENTS

| | | | |
|---|---|---|---|
| 3,161,670 | 12/1964 | Adams et al. | 260—604 R |
| 3,232,978 | 2/1966 | Yasuhara et al. | 252—469 X |
| 3,492,281 | 1/1970 | Notari et al. | 252—467 |

DANIEL E. WYMAN, Primary Examiner

W. J. SHINE, Assistant Examiner

U.S. Cl. X.R.

252—461, 469, 475; 260—465.3, 604 R